United States Patent Office 3,520,948
Patented July 21, 1970

3,520,948
LAMINATING RESINS OF MIXTURES OF SILOXANE
James Caithness Cuthill, Ardrossan, Scotland, assignor to Imperial Chemical Industries Limited, London, England, a corporation of Great Britain
No Drawing. Filed Oct. 27, 1967, Ser. No. 678,539
Claims priority, application Great Britain, Oct. 31, 1966, 48,702/66
Int. Cl. C08g 47/04
U.S. Cl. 260—825     11 Claims

ABSTRACT OF THE DISCLOSURE

Laminating resins providing laminates of improved physical properties are provided. The laminating resins are mixtures of siloxanes wherein the component (A) is a silane of the formula $R_nSiY_{4-n}$ where Y is a hydroxy or alkoxy and $n$ is 1 or 2 and at least one silane of the formula: $R_m'SiZ_{4-m}$, where Z is alkoxy or acyloxy and $m$ is 0, 1 or 2 and R and R' are hydrocarbyl or substitute hydrocarbyl with a reaction product of a disilanol and a silane of the formula $R_s^4SiQ_{4-s}$ where R is a monovalent hydrocarbyl, halogen or hydrogen and Q is $OR^5$ or $NR_2^6$, and $R^5$ and $R^6$ are monovalent hydrocarbyl and $s$ is 0 or 1.

---

This invention relates to resin compositions and more particularly to resin compositions based on organopolysilxanes.

A wide variety of resin compositions based on organopolysiloxanes are known and many are readily available. Not all of these, however, are in all cases entirely satisfactory.

According to the present invention a new and useful resin composition comprises in admixture (A) a product of reaction of at least one silane (1) of general formula $R_nSiY_{4-n}$ where R is a monovalent hydrocarbyl or substituted hydrocarbyl group, Y is a hydroxy or alkoxy group and $n$ is 1 or 2 and at least one other silane (2) of general formula $R_m'SiZ_{4-m}$ where R' is a monovalent hydrocarbyl or substituted hydrocarbyl group, Z is an alkoxy or acyloxy group and $m$ is 0.1 or 2, Z being an acyloxy group when Y is an alkoxy group, and (B) a reaction product of a compound of the general formula

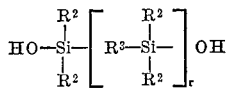

where $R^2$ is a monovalent hydrocarbyl or substituted hydrocarbyl group, $R^3$ is a divalent aromatic group and $r$ is 0 or 1 with a compound of the general formula

where $R^4$ is a monovalent hydrocarbyl or substituted hydrocarbyl group, hydrogen or a halogen, Q is a group $OR^5$ or $NR_2^6$, where $R^5$ is a monovalent hydrocarbyl or substituted hydrocarbyl group and $R^6$ is a monovalent hydrocarbyl or substituted hydrocarbyl group or hydrogen, and $s$ is 0 or 1, or with a partial hydrolysate or polymerisate thereof.

The preparation of reaction Product (A) is fully described in our co-pending application No. 48,701/66 corresponding to U.S. application Ser. No. 678,537, filed Oct. 27, 1967, now abandoned, while the preparation of Product (B) is fully described in our co-pending applications Nos. 7,600 and 48,325, corresponding to U.S. application Ser. No. 523,951, filed February 1966, and now U.S. Pat. 3,440,191.

While reaction product (A) and reaction product (B) each have many valuable uses and properties it has been found that in admixture the properties of each are enhanced, for example, the mechanical properties and the resistance to heat ageing of laminates prepared therefrom are improved. The two products may be admixed in a wide range of proportions, for example, from 5 to 100 or more parts by weight of product (A) per 100 parts by weight of product (B). In general it is preferred that from 40 to 100 parts by weight of product (A) be used per 100 parts by weight of product (B).

It is also generally preferred that the resin composition contains a solvent. The solvent, if used, may be present, for example, in amount from 80 to 500 or more percent by weight of the total weight of the two products. Suitable solvents include, for example, toluene, xylene, ethyl acetate and orthodichlorobenzene.

The groups R and R', which may or may not be the same may be substituted or unsubstituted alkyl, aryl, alkaryl, aralkyl, cycloalkyl, alkenyl or cycloalkenyl groups. Suitable groups include, for example methyl, ethyl, propyl, 2,2,2-trifluoropropyl, vinyl, cyclohexyl, phenyl, tetrachlorophenyl, tolyl, benzyl and cyclopentenyl groups. For many purposes it is preferred that the groups R and R' be the same and that they be phenyl groups.

Alkoxy groups suitable as group Y includes, for example, methoxy, ethoxy, butoxy and isobutoxy groups. While $n$ may be 1 or 2 it is in many cases preferred that it be 1.

The group Z may be selected from a wide variety of acyloxy groups. In general acetoxy groups are preferred.

As stated already $m$ may be 0, 1 or 2. For many purposes it is however preferred that it be 1. It is also generally preferred to use only one of each such silanes in the reaction mixture for the preparation of the product (A).

The reaction may or may not be carried out in presence of a solvent. Suitable solvents which may be used include, for example, toluene, xylene and o-dichlorobenzene. In many cases it is, however, preferred not to use a solvent.

Reaction is achieved by heating to, for example, from 150 to 200° C. In general however, it is preferred to react at the reflux temperature of the reaction mixture.

After reaction is complete part of the solvent may, if desired, be removed by distillation. The resin solutions obtained by the reaction are stable and retain their properties for long periods of time.

The proportions of the reactants may vary widely, for example, from 0.5 to 2 moles of silane (1) per mole of silane (2). For many purposes it is preferred that the molar proportions be 1 mole of silane (1) per mole of silane (2).

It is in many cases desirable to carry out the reaction in presence of a catalyst, for example, of the type consisting of carboxylic acid salts of tin or zinc. Suitable catalysts which may be used include, for example, stannous octoate, dibutyl tin dilaurate, dibutyl tin 2-ethyl-hexoate, dioctyltin oxide and zinc octoate. Stannous octoate is in many cases preferred. If a catalyst is used it may be used in amount from 0.2 to 5 percent or more and preferably from 1 to 2 percent by weight of the silanes in the reaction mixture.

In the preparation of reaction product (B) the groups $R^2$, which may or may not be all alike, may be selected from a wide variety of monovalent hydrocarbyl or substituted hydrocarbyl groups and may, for example, be alkyl, aryl, aralkyl, alkaryl, cycloalkyl, alkenyl or cycloalkenyl groups or such groups containing one or more substituents. Suitable groups which may be used include, for example, methyl, ethyl, propyl, 3,3,3-trifluoropropyl, cyclohexyl, phenyl, tetrachlorophenyl, tolyl, vinyl and cyclopentenyl groups. In many cases it is preferred that all the $R^2$ groups be alike. It is also preferred for many purposes that they be phenyl groups.

The group $R^3$ may be any divalent aromatic group. Suitable groups include, for example, phenylene, diphenylene and diphenyleneoxide groups. In many cases it is preferred that $R^3$ be a phenylene group.

The group $R^4$ may be selected from a wide variety of monovalent hydrocarbyl or halo substituted hydrocarbyl groups or may be a hydrogen or a halogen atom. It may be, for example, an alkyl, aryl, alkaryl, aralkyl, cycloalkyl, alkenyl or cycoalkenyl group or such a group containing one or more substituents or chlorine, bromine or iodide. Suitable groups which may be used include, for example, methyl, ethyl, propyl, n-butyl, 3,3,3-trifluoropropyl, phenyl, tetrachlorophenyl, tolyl, benzyl, cyclohexyl, vinyl and cyclopentenyl groups. In many cases it is preferred that the group $R^4$ be selected from phenyl groups, hydrogen and chlorine.

The group $R^5$ may be selected from a wide variety of monovalent hydrocarbyl groups or alkoxy substituted hydrocarbyl groups. Suitable groups which may be used include, for example, methyl, ethyl, propyl, butyl, phenyl, ethoxyethyl or methoxyethyl groups. Preferably lower alkyl groups are used and in many cases methyl groups are preferred.

$R^6$ may be selected from the same groups as $R^5$ or may be hydrogen but is preferably an ethyl group.

The disilanol or silane diol and the silane may be reacted together in widely varying proportions. Thus for every 4 moles of the diol there may be used from 1 to 4 or more moles of the silane. It is, however, in general preferred to use from 1.5 to 3 moles of the silane for every 4 moles of the diol.

The reaction is preferably carried out in the presence of a catalyst of the type known to be suitable for reaction between a compound containing an $\equiv$SiOH group and a compound containing an $\equiv$SiOR group. Suitable catalysts include, for example, those stated above as suitable for the preparation of product (A). In many cases stannous octoate is preferred. The catalyst may be used in widely varying amounts, for example, up to 5 percent or more by weight of the organosilicon compounds. It is, however, in general preferred to use amounts of from 0.5 to 1.5 percent.

The temperature at which the reaction may be carried out may vary widely. Suitable temperatures may be, for example, from 80 to 200° C. or higher. In any specific case the optimum temperature will in general be governed by the specific reactants and solvent, if any, used since it is normally preferred to operate at the highest practicable temperature and this will, in many cases, be the refluxing temperature of the reaction mixture.

The reaction is preferably carried out in the presence of an inert solvent. Suitable solvents which may be used, include, for example, toluene, o-dichlorobenzene cyclohexanone, methylcyclohexanone, 2-ethoxyethanol, 2-ethoxyethyl acetate and xylene. The solvent may be used in amounts of, for example, from 70 to 200 percent or more by weight of the organosilicon compounds. If a solvent is used it need not necessarily be removed from the composition before use and in fact it is normally preferred to use an amount of solvent which will give a solution of the desired final concentration.

The time required for complete reaction will vary with the specific reactants used, the proportions thereof, the solvent, if any, and the reaction temperature. In general, reaction is complete in a period of from 1½ to 3 hours. The extent to which the reaction has progressed may be determined, for example, by withdrawing a sample, removing any solvent present therefrom and heating to the insoluble, infusible state. Reaction is normally considered to have progressed sufficiently when the cure time, at 250° C., is not greater than about 30 minutes.

The compositions of our invention may be cured to the insoluble, infusible state by removal of solvent followed by heating to a temperature of from 125 to 250° C. for a period of from 1 to 30 minutes. They may be used for a wide variety of purposes but are particularly useful as laminating resins and in the production of filled moulding powders, for example, such as glass fibre or asbestos laminates and glass fibre and asbestos filled moulding powders. They are also useful for casting films.

Our invention is further illustrated by the following examples in which all parts, proportions and percentages are by weight.

EXAMPLES 1 TO 9

Product A

Solution A1.—120 parts of phenyltriethoxysilane and 110 parts of methyltriacetoxysilane were heated to 130° C. and 5 parts of stannous octoate added thereto. The mixture was heated under reflux for 2½ hours after which it was cooled to 20° C. whereby a clear resin solution was obtained. A film cast from this solution was heated for 10 minutes at 150° C. and gave an insoluble, infusible film.

Solution A2.—240 parts of phenyltriethoxysilane and 282 parts of phenyltriacetoxysilane were heated to 130° C. and 5 parts of stannous octoate added thereto. The mixture was heated under reflux for 2½ hours after which it was cooled to 20° C. whereby a clear resin solution was obtained. A film cast from this solution was heated for 10 minutes at 150° C. and gave an insoluble, infusible film.

Solution A3.—240 parts of phenyltriethoxysilane and 282 parts phenyltriacetoxysilane were heated to 130° C. and 5 parts of stannous octoate. The mixture was heated under reflux for 2½ hours after which it was cooled to 20° C. whereby a clear resin solution was obtained.

Solution A4.—282 parts of phenyltripropoxysilane and 324 parts of phenyltripropionyloxysilane were heated to 120° C., 12 parts of stannous octoate added and the mixture heated under reflux for 3 hours. It was then cooled to 20° C. whereby a clear resin solution was obtained.

Solution A5.—240 parts of phenyltriethoxysilane and 324 parts of phenyltripropionyloxysilane were heated to 150° C., 11 parts of stannous octoate added thereto and the mixture heated under reflux for 4 hours. It was then cooled to 20° C. whereby a clear resin solution was obtained.

Solution A6.—282 parts of phenyltripropoxysilane and 282 parts of phenyltri-acetoxysilane were heated to 150° C., 12 parts of stannous octoate added and the mixture heated under reflux for 4 hours. It was then cooled to 20° C., whereby a clear resin solution was obtained.

Product B 474 parts of bis(hydroxydiphenylsilyl)benzene, 104 parts of tetraethoxysilane and 400 parts of o-dichlorobenzene were heated under reflux for 5 minutes. 5 parts of stannous octoate were then added and the heating continued for 2 hours. The solution was then cooled and filtered to give a clear resin solution. A film was cast from this solution and cured to a hard, insoluble, infusible film by heating for 5 to 10 minutes at 180° C.

The solutions of product A and product B were blended together in varying proportions to give compositions according to our invention. The so obtained compositions were used to form asbestos laminates.

PREPARATION OF LAMINATES

A mat of asbestos fibres supported on a wire gauze was impregnated with the composition and after air-drying the solvent was removed at 90–100° C. The resin-impregnated asbestos mat was then heated for 10 minutes at 150° C. The same procedure was carried out with five other asbestos mats and the six were then stacked between metal plates and pressed at 750 p.s.i. at 195° C. for 3 hours. The press was then allowed to cool to 100° C. and the laminate removed. Further curing was effected by heating for 24 hours at 150° C., then 24 hours at 200° C. and finally 48 hours at 250° C.

For purposes of comparison similar laminates were formed from product B alone.

The flexural strengths and densities of all the laminates were determined and are given in the following Table 1.

TABLE 1

| Example | Product A | Proportion (A/B) | Flexural strength (p.s.i.) | | Density, g./cc. |
|---|---|---|---|---|---|
| | | | 20° C. | 200° C. | |
| 1 | Solution A1 | 50/50 | 32,800 | 16,630 | 1.62 |
| 2 | Solution A2 | 0/100 | 36,100 | 9,450 | 1.57 |
| 3 | do | 10/90 | 39,800 | 15,800 | 1.65 |
| 4 | do | 30/70 | 40,290 | 17,820 | 1.63 |
| 5 | do | 50/50 | 39,100 | 17,820 | 1.65 |
| 6 | Solution A3 | 30/70 | 40,400 | 17,700 | 1.65 |
| 7 | do | 50/50 | 38,670 | 18,920 | 1.65 |
| 8 | Solution A4 | 50/50 | 34,750 | 15,700 | 1.60 |
| 9 | Solution A5 | 50/50 | 33,270 | 15,700 | 1.60 |
| 10 | Solution A6 | 50/50 | 33,630 | 16,000 | 1.60 |

The beneficial effect of blending product A with product B can be seen when the flexural strengths of asbestos laminates prepared from (1) Product B, (2) 30/70 mixture of product A and product B, and (3) 50/50 mixture of product A and product B, are compared after periods of heat ageing at 300° C. (Table 2) and at 400° C. (Table 3). The values for the laminates made from the blended resins are considerably higher both at 20° C. and at 300° C.

TABLE 2.—FLEXURAL STRENGTH OF ASBESTOS LAMINATES AFTER HEAT AGEING AT 300° C.

| Composition | Time of exposure (hour) | Flexural strength (p.s.i.) | | Density (g./cc.) |
|---|---|---|---|---|
| | | 20° C. | 300° C. | |
| Product B | 0 | 36,100 | 9,450 | 1.56 |
| | 120 | 33,350 | 14,400 | |
| | 270 | 29,700 | 17,680 | |
| | 500 | 26,200 | 14,700 | |
| | 1,000 | 23,100 | 14,900 | |
| Example 3 | 0 | 40,290 | 17,820 | 1.63 |
| | 130 | 40,600 | 23,400 | 1.63 |
| | 330 | 36,600 | 23,950 | 1.64 |
| | 570 | 35,400 | 23,650 | 1.64 |
| | 1,000 | 28,650 | 22,900 | 1.62 |
| Example 4 | 0 | 39,100 | 18,450 | 1.64 |
| | 130 | 38,700 | 23,350 | 1.64 |
| | 330 | 36,300 | 22,300 | 1.64 |
| | 570 | 34,200 | 22,450 | 1.64 |
| | 1,000 | 28,300 | 23,600 | 1.63 |

TABLE 3.—FLEXURAL STRENGTH OF ASBESTOS LAMINATES AFTER HEAT AGEING AT 400° C.

| Resin | Time of exposure (hour) | Flexural strength (p.s.i.) | | Density (g./cc.) |
|---|---|---|---|---|
| | | 20° C. | 300° C. | |
| Product B | 0 | 36,100 | 9,450 | 1.56 |
| | 20 | 12,850 | 12,050 | 1.36 |
| | 90 | 10,750 | 13,700 | 1.24 |
| | 170 | 10,450 | 12,100 | 1.26 |
| Example 3 | 0 | 40,290 | 17,820 | 1.63 |
| | 25 | 21,500 | 19,500 | 1.46 |
| | 100 | 17,950 | 19,450 | 1.35 |
| | 360 | 17,050 | 18,450 | 1.30 |
| | 1,000 | 17,550 | 17,750 | 1.29 |
| Example 4 | 0 | 39,100 | 18,450 | 1.64 |
| | 25 | 21,250 | 17,300 | 1.44 |
| | 100 | 17,400 | 17,850 | 1.35 |
| | 500 | 19,200 | 19,600 | 1.35 |
| | 1,000 | 20,550 | 21,300 | 1.33 |

What I claim is:

1. A resin composition comprising in admixture (A) a resinous condensation reaction product of reaction of at least one silane (1) of general formula $R_nSiY_{4-n}$ where Y is a hydroxy or alkoxy group and $n$ is 1 or 2 and at least one other silane (2) of general formula $R_m'SiZ_{4-m}$ where Z is an alkoxy or acyloxy group and $m$ is 0, 1 or 2, Z being an acyloxy group when Y is an alkoxy group and wherein the groups R and R' are selected from the group consisting of methyl, ethyl, propyl, 3,3,3-trifluoropropyl, vinyl, cyclohexyl, phenyl, tetrachlorophenyl, tolyl, benzyl and cyclopentenyl groups, and (B) a resinous condensation reaction product of a compound of the general formula

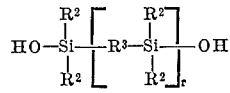

where $R^2$ is selected from the group consisting of methyl, ethyl, propyl, 3,3,3-trifluoropropyl, phenyl, cyclohexyl, tetrachlorophenyl, tolyl, vinyl, and cyclopentenyl groups, $R^3$ is selected from the group consisting of phenylene, diphenylene and diphenylene-oxide groups and $r$ is 1, with a compound of the general formula $R_s^4SiQ_{4-s}$ where $R^4$ is a monovalent hydrocarbyl, monovalent halo substituted hydrocarbyl, hydrogen and halogen, Q is a group $OR^5$ or $NR_2^6$ where $R^5$ is a monovalent hydrocarbyl or monovalent alkoxy hydrocarbyl group and $R^6$ is a monovalent hydrocarbyl or monovalent alkoxy hydrocarbyl group or hydrogen and $s$ is 0 or 1, or with a partial hydrolysate or polymerisate thereof, wherein the proportion of (A) to (B) is from 5 to 100 parts by weight of (A) per 100 parts by weight of (B), the proportion of silane (1) to silane (2) is from 0.5 to 2 mols of silane (1) per mol of silane (2), and the proportion of diol to the silane of reaction product (B) is between 1 to 4 mols of silane per 4 mols of diol.

2. A composition according to claim 1 wherein the reaction products of (A) and (B) are obtained at reaction temperatures of from 150 to 200° C. and from 80 to 200° C., respectively.

3. A composition according to claim 1 wherein R and R' are alike and are phenyl groups.

4. A composition according to claim 1 wherein Y is selected from methoxy, ethoxy, n-butoxy and isobutoxy groups.

5. A composition according to claim 1 wherein $n$ is 1.

6. A composition according to claim 1 wherein the group Z is an acetoxy group.

7. A composition according to claim 1 wherein $m$ is 1.

8. A composition according to claim 1 wherein $R^4$ is selected from methyl, ethyl, propyl, n-butyl, 3,3,3-trifluoropropyl, phenyl tetrachlorophenyl, tolyl, benzyl, cyclohexyl, vinyl, and cyclopentenyl groups, hydrogen and chlorine.

9. A composition according to claim 1 wherein Q is $OR^5$ and $R^5$ is selected from methyl, ethyl, propyl, butyl, phenyl, ethoxyethyl and methoxyethyl groups.

10. A composition according to claim 1 wherein Q is $NR_2^6$ and $R^6$ is selected from methyl, ethyl, propyl, butyl, phenyl, ethoxyethyl and methoxyethyl group.

11. Articles and films comprising a composition as claimed in claim 1 which has been cured to an insoluble infusible state by heating.

References Cited

UNITED STATES PATENTS

| 2,698,314 | 12/1954 | Rust | 260—825 |
| 2,934,464 | 4/1960 | Hoffman et al. | 260—825 |
| 2,977,336 | 3/1961 | Blatz | 260—825 |
| 3,440,191 | 4/1969 | Cuthill et al. | 260—46.5 |

OTHER REFERENCES

Noll, "Chemie und Technologie der Silicone," Verlag Chemie, Weinheim, Germany, publ. (1960), p. 131.

SAMUEL H. BLECH, Primary Examiner

U.S. Cl. X.R.

156—329; 161—205, 206; 260—18, 31.2, 31.4, 32.8, 33.2, 33.6, 33.8, 37, 46.5